US008811369B2

(12) United States Patent
Laroia et al.

(10) Patent No.: US 8,811,369 B2
(45) Date of Patent: Aug. 19, 2014

(54) METHODS AND APPARATUS FOR SUPPORTING MULTIPLE COMMUNICATIONS MODES OF OPERATION

(75) Inventors: Rajiv Laroia, Far Hills, NJ (US); Junyi Li, Chester, NJ (US); Thomas Richardson, South Orange, NJ (US); Xinzhou Wu, Monmouth Junction, NJ (US); Aleksandar Jovicic, Piscataway, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 654 days.

(21) Appl. No.: 12/246,922

(22) Filed: Oct. 7, 2008

(65) Prior Publication Data

US 2009/0040996 A1 Feb. 12, 2009

Related U.S. Application Data

(63) Continuation-in-part of application No. 11/621,972, filed on Jan. 10, 2007.

(60) Provisional application No. 60/758,010, filed on Jan. 11, 2006, provisional application No. 60/758,011, (Continued)

(51) Int. Cl.

*H04J 1/00* (2006.01)
*H04B 7/216* (2006.01)
*H04W 4/00* (2009.01)
*H04W 72/06* (2009.01)
*H04W 84/04* (2009.01)
*H04W 88/06* (2009.01)
*H04W 48/08* (2009.01)

(52) U.S. Cl.

CPC ............ *H04W 72/06* (2013.01); *H04W 84/042* (2013.01); *H04W 88/06* (2013.01); *H04W 48/08* (2013.01)

USPC ............................ 370/343; 370/324; 370/328

(58) Field of Classification Search

USPC ........................................................ 370/328

See application file for complete search history.

(56) References Cited

U.S. PATENT DOCUMENTS 2,972,743 A 2/1961 Svensson et al.

(Continued)

FOREIGN PATENT DOCUMENTS

CN 1310927 A 8/2001

(Continued)

OTHER PUBLICATIONS

Brandes S., et al., "Reduction of Out-of-Band Radiation in OFDM Based Overlay Systems," Frontiers in Dynamic Spectrum Access Networks, 2005, 662-665.

(Continued)

*Primary Examiner* — Derrick Ferris
*Assistant Examiner* — Kodzovi Acolatse
(74) *Attorney, Agent, or Firm* — James K. O'Hare

(57) ABSTRACT

Methods and apparatus for supporting multiple modes of communication operation, e.g., with different parameters and/or frequency bands being used in the different modes of operation are described. One or more adjustments are made based on a signal or signals received in a first frequency band from a second communications device, e.g., an access router with reliable timing. The communications device selects between and operates in either the first frequency band, e.g., a WAN frequency band, or in a second frequency band, e.g., a LAN frequency band. The WAN and LAN frequency bands may be non-overlapping. One or more parameters used in the second frequency band have a predetermined relationship to one or more parameters used for communications in the first frequency band making the adjustment based on the signal received in the first frequency band relevant and useful to support communications in the second frequency band.

30 Claims, 5 Drawing Sheets

Related U.S. Application Data filed on Jan. 11, 2006, provisional application No. 60/758,012, filed on Jan. 11, 2006, provisional application No. 60/845,052, filed on Sep. 15, 2006, provisional application No. 60/845,051, filed on Sep. 15, 2006, provisional application No. 60/863,304, filed on Oct. 27, 2006.

(56) References Cited

U.S. PATENT DOCUMENTS 5,216,693 A 6/1993 Nakamura
5,233,627 A 8/1993 Kozima et al.
5,535,425 A 7/1996 Watanabe
5,583,870 A 12/1996 Delprat et al.
5,701,589 A 12/1997 Lee et al.
5,726,893 A 3/1998 Schuchman et al.
5,754,542 A 5/1998 Ault et al.
5,805,575 A 9/1998 Kamin, Jr.
5,818,871 A 10/1998 Blakeney, II et al.
5,839,074 A 11/1998 Plehn
5,844,900 A 12/1998 Hong et al.
5,852,780 A 12/1998 Wang et al.
5,903,618 A 5/1999 Miyake et al.
5,940,765 A 8/1999 Haartsen
5,953,323 A 9/1999 Haartsen
5,991,639 A 11/1999 Rautiola et al.
5,995,500 A 11/1999 Ma et al.
5,995,844 A 11/1999 Fukuda
6,011,515 A 1/2000 Radcliffe et al.
6,047,178 A 4/2000 Frlan
6,175,747 B1 1/2001 Tanishima et al.
6,230,012 B1 5/2001 Willkie et al.
6,377,608 B1 4/2002 Zyren
6,389,062 B1 * 5/2002 Wu ................................ 375/222
6,473,418 B1 10/2002 Laroia et al.
6,545,997 B1 4/2003 Bohnke et al.
6,574,266 B1 6/2003 Haartsen
6,580,981 B1 6/2003 Masood et al.
6,609,010 B1 * 8/2003 Dolle et al. ................ 455/552.1
6,611,507 B1 8/2003 Hottinen et al.
6,614,769 B1 9/2003 Erlick et al.
6,650,629 B1 11/2003 Takahashi et al.
6,671,525 B2 12/2003 Allen et al.
6,725,058 B2 4/2004 Rinne et al.
6,728,232 B2 4/2004 Hasty, Jr. et al.
6,735,448 B1 5/2004 Krishnamurthy et al.
6,741,836 B2 5/2004 Lee et al.
6,744,743 B2 6/2004 Walton et al.
6,760,599 B1 7/2004 Uhlik
6,763,013 B2 7/2004 Kennedy
6,771,963 B1 8/2004 Chen et al.
6,859,463 B1 2/2005 Mayor et al.
6,882,632 B1 4/2005 Koo et al.
6,882,851 B2 4/2005 Sugar et al.
6,920,171 B2 7/2005 Souissi et al.
6,922,388 B1 7/2005 Laroia et al.
6,934,299 B2 8/2005 Kaatz
6,940,827 B2 9/2005 Li et al.
6,940,843 B2 9/2005 Goodall et al.
6,975,600 B1 12/2005 Vaughan et al.
6,975,855 B1 12/2005 Wallenius
6,982,987 B2 1/2006 Cain
6,985,087 B2 1/2006 Soliman
6,990,087 B2 1/2006 Rao et al.
7,006,451 B2 2/2006 Kuwahara
7,013,145 B1 3/2006 Centore, III
7,016,649 B1 3/2006 Narasimhan et al.
7,016,673 B2 3/2006 Reddy et al.
7,019,616 B2 3/2006 Fernandez
7,027,409 B2 4/2006 Cain
7,035,221 B2 4/2006 Furukawa et al.
7,039,372 B1 5/2006 Sorrells et al.
7,072,650 B2 7/2006 Stanforth
7,092,353 B2 8/2006 Laroia et al.
7,092,391 B2 8/2006 Umeda
7,103,314 B2 9/2006 Li
7,130,368 B1 * 10/2006 Aweya et al. ................ 375/376
7,133,697 B2 11/2006 Judd et al.
7,136,655 B2 11/2006 Skafidas et al.
7,146,130 B2 12/2006 Hsu et al.
7,149,201 B2 12/2006 Hunzinger
7,151,945 B2 12/2006 Myles et al.
7,164,885 B2 1/2007 Jonsson et al.
7,167,463 B2 1/2007 Alapuranen
7,174,187 B1 2/2007 Ngan
7,180,884 B2 2/2007 Elliott et al.
7,194,263 B2 3/2007 Bahl et al.
7,218,689 B2 5/2007 Gupta
7,221,667 B2 5/2007 Hori et al.
7,224,954 B2 5/2007 Okajima et al.
7,228,138 B2 6/2007 Hansson et al.
7,233,602 B2 6/2007 Chen et al.
7,246,235 B2 7/2007 Ellison et al.
7,248,570 B2 7/2007 Bahl et al.
7,260,399 B1 8/2007 Oh et al.
7,269,169 B1 9/2007 Venkataraman et al.
7,280,467 B2 10/2007 Smee et al.
7,280,810 B2 10/2007 Feher
7,298,716 B2 11/2007 Abraham et al.
7,313,628 B2 12/2007 Chaskar et al.
7,333,829 B2 2/2008 Malone et al.
7,336,626 B1 2/2008 Barratt et al.
7,336,927 B2 2/2008 Diaz Cervera et al.
7,339,883 B2 3/2008 Santhoff et al.
7,342,834 B2 3/2008 Ishibashi
7,342,896 B2 3/2008 Ayyagari
7,342,900 B2 3/2008 Xiong et al.
7,352,733 B2 4/2008 Green
7,366,200 B2 4/2008 Laroia et al.
7,378,953 B2 5/2008 Coronel et al.
7,388,845 B2 6/2008 Laroia et al.
7,388,857 B2 6/2008 Sharma
7,401,224 B2 7/2008 Gantman et al.
7,424,268 B2 9/2008 Diener et al.
7,426,396 B2 9/2008 Iwasaki et al.
7,440,754 B2 10/2008 Bahl et al.
7,457,646 B2 11/2008 Mahany et al.
7,477,897 B2 1/2009 Bye
7,489,651 B2 2/2009 Sugaya et al.
7,493,149 B1 2/2009 Doyle et al.
7,499,418 B2 3/2009 Oprescu-Surcobe et al.
7,502,341 B2 3/2009 Matoba et al.
7,512,096 B2 3/2009 Kuzminskiy et al.
7,522,551 B2 4/2009 Giaimo et al.
7,545,771 B2 6/2009 Wentink et al.
7,548,758 B2 6/2009 Periyalwar et al.
7,570,627 B2 8/2009 Welborn et al.
7,570,969 B2 8/2009 Hwang et al.
7,583,644 B2 9/2009 Morioka et al.
7,586,881 B2 9/2009 Hansen et al.
7,590,183 B2 9/2009 Yonge, III
7,613,426 B2 11/2009 Kuehnel et al.
7,626,975 B2 12/2009 Colban et al.
7,653,011 B2 1/2010 Rahman et al.
7,657,276 B2 2/2010 Sakoda
7,660,595 B2 2/2010 Ramaswamy et al.
7,664,055 B2 2/2010 Nelson
7,664,130 B2 2/2010 Sakoda et al.
7,720,029 B2 5/2010 Orava et al.
7,720,172 B2 5/2010 Nakagawa et al.
7,724,713 B2 5/2010 Del Prado Pavon et al.
7,729,240 B1 6/2010 Crane et al.
7,756,521 B2 7/2010 Gerlach et al.
7,925,010 B2 4/2011 Sannino et al.
8,498,237 B2 7/2013 Corson et al.
8,504,099 B2 8/2013 Corson et al.
8,554,226 B2 10/2013 Laroia et al.
2001/0055980 A1 12/2001 Sato
2002/0105970 A1 8/2002 Shvodian
2002/0128049 A1 9/2002 Davis
2002/0131121 A1 9/2002 Jeganathan et al.
2002/0131386 A1 9/2002 Gwon
2002/0193945 A1 12/2002 Tan et al.
2002/0196771 A1 12/2002 Vij et al.

(56) References Cited

U.S. PATENT DOCUMENTS

2002/0196844 A1 12/2002 Rafie et al.
2003/0002482 A1 1/2003 Kubler et al.
2003/0007473 A1 1/2003 Strong et al.
2003/0012188 A1 1/2003 Zelig et al.
2003/0063655 A1 4/2003 Young
2003/0069035 A1 4/2003 Shurvinton
2003/0078031 A1 4/2003 Masuda
2003/0078037 A1 4/2003 Auckland et al.
2003/0108016 A1 6/2003 Bonta
2003/0128659 A1 7/2003 Hirsch et al.
2003/0142631 A1 7/2003 Silvester
2003/0145064 A1 7/2003 Hsu et al.
2003/0169697 A1 9/2003 Suzuki et al.
2003/0217266 A1 11/2003 Epp et al.
2004/0005904 A1 1/2004 Wolf et al.
2004/0009781 A1 1/2004 Andrews et al.
2004/0032536 A1 2/2004 Islam et al.
2004/0047324 A1 3/2004 Diener
2004/0057400 A1 3/2004 Walsh et al.
2004/0064568 A1 4/2004 Arora et al.
2004/0067773 A1 4/2004 Rachabathuni et al.
2004/0072558 A1 4/2004 Van Bosch
2004/0077346 A1 4/2004 Krenik et al.
2004/0077366 A1 4/2004 Panasik et al.
2004/0081117 A1* 4/2004 Malek et al. .................. 370/324
2004/0082326 A1 4/2004 Shaw et al.
2004/0082356 A1 4/2004 Walton et al.
2004/0095902 A1 5/2004 Laroia et al.
2004/0095904 A1 5/2004 Laroia et al.
2004/0106401 A1 6/2004 Ormson
2004/0114521 A1 6/2004 Sugaya
2004/0125776 A1 7/2004 Haugli et al.
2004/0125778 A1 7/2004 Lin et al.
2004/0127204 A1 7/2004 Belmont
2004/0133689 A1 7/2004 Vasisht
2004/0145604 A1 7/2004 Min
2004/0147223 A1 7/2004 Cho
2004/0152464 A1 8/2004 Sugaya
2004/0162871 A1 8/2004 Pabla et al.
2004/0165563 A1 8/2004 Hsu et al.
2004/0176059 A1* 9/2004 Hayem et al. .............. 455/168.1
2004/0190483 A1 9/2004 Shahaf et al.
2004/0203762 A1 10/2004 Liu et al.
2004/0204850 A1 10/2004 MacNeille et al.
2004/0240401 A1 12/2004 Willenegger et al.
2004/0240405 A1 12/2004 Okazaki
2004/0240476 A1 12/2004 Joshi
2004/0249448 A1 12/2004 Gault
2004/0258006 A1 12/2004 An
2004/0259529 A1 12/2004 Suzuki
2005/0009578 A1 1/2005 Liu
2005/0037754 A1 2/2005 Liu et al.
2005/0058102 A1 3/2005 Santhoff et al.
2005/0058117 A1 3/2005 Morioka et al.
2005/0058229 A1 3/2005 Alagha
2005/0060535 A1 3/2005 Bartas
2005/0063344 A1 3/2005 Winzell
2005/0063416 A1 3/2005 Shin et al.
2005/0068934 A1 3/2005 Sakoda
2005/0075118 A1 4/2005 Lewis et al.
2005/0085190 A1 4/2005 Nishikawa
2005/0088980 A1 4/2005 Olkkonen et al.
2005/0090266 A1 4/2005 Sheynblat
2005/0105491 A1 5/2005 Chaskar et al.
2005/0111397 A1 5/2005 Attar et al.
2005/0117525 A1 6/2005 Poustchi et al.
2005/0128991 A1 6/2005 Dayanandan et al.
2005/0129221 A1 6/2005 Dickens et al.
2005/0135295 A1 6/2005 Walton et al.
2005/0143119 A1 6/2005 Chandra et al.
2005/0152280 A1 7/2005 Pollin et al.
2005/0153736 A1* 7/2005 Ganton ...................... 455/553.1
2005/0157660 A1 7/2005 Mandato et al.
2005/0176371 A1 8/2005 Palin et al.
2005/0177639 A1 8/2005 Reunamaki et al.
2005/0185628 A1 8/2005 Watanabe et al.
2005/0185669 A1 8/2005 Welborn et al.
2005/0201308 A1 9/2005 Sekiya et al.
2005/0210157 A1 9/2005 Sakoda
2005/0220201 A1 10/2005 Laroia et al.
2005/0226175 A1 10/2005 Gupta et al.
2005/0227692 A1 10/2005 Kawashima et al.
2005/0227698 A1 10/2005 Nonin et al.
2005/0233742 A1 10/2005 Karaoguz et al.
2005/0233746 A1 10/2005 Laroia et al.
2005/0238083 A1 10/2005 Laroia et al.
2005/0250469 A1 11/2005 Laroia et al.
2005/0254435 A1 11/2005 Moakley et al.
2005/0265218 A1 12/2005 Molisch et al.
2005/0265221 A1 12/2005 Batra et al.
2005/0281320 A1 12/2005 Neugebauer
2005/0286477 A1 12/2005 Gupta et al.
2006/0013160 A1* 1/2006 Haartsen ....................... 370/328
2006/0014542 A1 1/2006 Khandekar et al.
2006/0019660 A1 1/2006 Li
2006/0020556 A1 1/2006 Hamnen
2006/0023686 A1 2/2006 Jeong et al.
2006/0025151 A1 2/2006 Karaoguz et al.
2006/0031583 A1 2/2006 Fujii et al.
2006/0034315 A1 2/2006 Maekawa et al.
2006/0039332 A1 2/2006 Kotzin
2006/0046728 A1 3/2006 Jung et al.
2006/0058059 A1 3/2006 Kim
2006/0073847 A1 4/2006 Pirzada et al.
2006/0083199 A1 4/2006 Yang
2006/0088010 A1 4/2006 Buchwald et al.
2006/0089099 A1 4/2006 Buchwald et al.
2006/0094456 A1 5/2006 Rittle et al.
2006/0105741 A1 5/2006 Suh et al.
2006/0111104 A1 5/2006 Hyslop
2006/0114853 A1 6/2006 Hasty, Jr. et al.
2006/0116113 A1 6/2006 Gass
2006/0116877 A1 6/2006 Pickering et al.
2006/0178131 A1 8/2006 Huotari et al.
2006/0203789 A1 9/2006 Iacono et al.
2006/0215611 A1 9/2006 Nakagawa et al.
2006/0223511 A1 10/2006 Hagale et al.
2006/0223574 A1 10/2006 Chandra
2006/0233125 A1 10/2006 Pajukoski et al.
2006/0251017 A1 11/2006 Bishop
2006/0253736 A1 11/2006 Rudolf et al.
2007/0019717 A1 1/2007 Laroia et al.
2007/0054624 A1 3/2007 Kashiwagi
2007/0064742 A1 3/2007 Shvodian
2007/0066360 A1 3/2007 Sato et al.
2007/0070179 A1 3/2007 Van Rooyen
2007/0086424 A1 4/2007 Calcev et al.
2007/0097922 A1 5/2007 Parekh et al.
2007/0100222 A1 5/2007 Mastrototaro et al.
2007/0104138 A1 5/2007 Rudolf et al.
2007/0111734 A1 5/2007 Beppu et al.
2007/0136459 A1 6/2007 Roche et al.
2007/0142084 A1 6/2007 Van Niekerk et al.
2007/0160016 A1 7/2007 Jain
2007/0165589 A1 7/2007 Sakoda
2007/0201423 A1 8/2007 Laroia et al.
2007/0206554 A1 9/2007 Laroia et al.
2007/0211677 A1 9/2007 Laroia et al.
2007/0211678 A1 9/2007 Li et al.
2007/0211679 A1 9/2007 Laroia et al.
2007/0211680 A1 9/2007 Laroia et al.
2007/0213046 A1 9/2007 Li et al.
2007/0247365 A1 10/2007 Laroia et al.
2007/0254596 A1 11/2007 Corson et al.
2007/0255960 A1 11/2007 Hon et al.
2007/0270190 A1 11/2007 Hisky et al.
2007/0274275 A1 11/2007 Laroia et al.
2007/0274276 A1 11/2007 Laroia et al.
2007/0286111 A1 12/2007 Corson et al.
2007/0291714 A1 12/2007 Laroia et al.
2007/0291715 A1 12/2007 Laroia et al.
2008/0002647 A1 1/2008 Laroia et al.
2008/0002648 A1 1/2008 Laroia et al.
2008/0013519 A1 1/2008 Kwon et al.

(56) References Cited

U.S. PATENT DOCUMENTS

| | | | |
|---|---|---|---|
| 2008/0031193 | A1 | 2/2008 | Laroia et al. |
| 2008/0037487 | A1 | 2/2008 | Li et al. |
| 2008/0039066 | A1 | 2/2008 | Laroia et al. |
| 2008/0043656 | A1 | 2/2008 | Yoon et al. |
| 2008/0069072 | A1 | 3/2008 | Callaway et al. |
| 2008/0075033 | A1 | 3/2008 | Shattil |
| 2008/0112334 | A1 | 5/2008 | Laroia et al. |
| 2008/0123600 | A1 | 5/2008 | Fodor |
| 2008/0212651 | A1 | 9/2008 | Santhoff et al. |
| 2008/0212771 | A1 | 9/2008 | Hauser |
| 2008/0318612 | A1 | 12/2008 | Axnas et al. |
| 2009/0017858 | A1 | 1/2009 | Kwon et al. |
| 2009/0059841 | A1 | 3/2009 | Laroia et al. |
| 2009/0092075 | A1 | 4/2009 | Corson et al. |
| 2009/0190558 | A1 | 7/2009 | Strutt et al. |
| 2009/0282253 | A1 | 11/2009 | Rose et al. |
| 2009/0296669 | A1 | 12/2009 | Uchiyama et al. |
| 2010/0128652 | A1 | 5/2010 | Lee et al. |
| 2013/0343283 | A1 | 12/2013 | Laroia |

FOREIGN PATENT DOCUMENTS

| | | | |
|---|---|---|---|
| CN | 1327354 | A | 12/2001 |
| CN | 1371583 | A | 9/2002 |
| CN | 1397117 | A | 2/2003 |
| CN | 1411237 | | 4/2003 |
| CN | 1578314 | A | 2/2005 |
| CN | 1596005 | A | 3/2005 |
| CN | 1650594 | A | 8/2005 |
| CN | 1663156 | | 8/2005 |
| CN | 1689345 | A | 10/2005 |
| CN | 1909386 | A | 2/2007 |
| EP | 0776134 | | 5/1997 |
| EP | 0848567 | A1 | 6/1998 |
| EP | 0969602 | A1 | 1/2000 |
| EP | 1089586 | A2 | 4/2001 |
| EP | 1119137 | A1 | 7/2001 |
| EP | 1241838 | | 9/2002 |
| EP | 1326386 | A1 | 7/2003 |
| EP | 1408651 | A2 | 4/2004 |
| EP | 1469659 | A1 | 10/2004 |
| EP | 1496668 | | 1/2005 |
| EP | 1549094 | A1 | 6/2005 |
| EP | 1562333 | | 8/2005 |
| EP | 1566944 | | 8/2005 |
| EP | 1592176 | A1 | 11/2005 |
| EP | 1670183 | A1 | 6/2006 |
| EP | 1895714 | | 3/2008 |
| EP | 2312885 | A1 | 4/2011 |
| GB | 232251 | A | 3/1926 |
| GB | 2375014 | | 10/2002 |
| GB | 2410653 | A | 8/2005 |
| JP | 7023465 | | 1/1995 |
| JP | 07143567 | | 6/1995 |
| JP | 8307934 | | 11/1996 |
| JP | 9107583 | | 4/1997 |
| JP | 10013324 | | 1/1998 |
| JP | 11289583 | A | 10/1999 |
| JP | 11355291 | | 12/1999 |
| JP | 2001069060 | A | 3/2001 |
| JP | 2001069557 | A | 3/2001 |
| JP | 2001118191 | A | 4/2001 |
| JP | 2002502164 | A | 1/2002 |
| JP | 2002112347 | A | 4/2002 |
| JP | 2002208891 | A | 7/2002 |
| JP | 2002223470 | | 8/2002 |
| JP | 2002232337 | A | 8/2002 |
| JP | 2002325281 | A | 11/2002 |
| JP | 2002344458 | A | 11/2002 |
| JP | 2003503920 | | 1/2003 |
| JP | 2003143644 | A | 5/2003 |
| JP | 2003158525 | A | 5/2003 |
| JP | 2003249939 | A | 9/2003 |
| JP | 2003258703 | A | 9/2003 |
| JP | 2003348636 | A | 12/2003 |
| JP | 2004032462 | A | 1/2004 |
| JP | 2004053510 | A | 2/2004 |
| JP | 2004128785 | A | 4/2004 |
| JP | 2004146883 | A | 5/2004 |
| JP | 2004147015 | A | 5/2004 |
| JP | 2004180297 | A | 6/2004 |
| JP | 2004242187 | A | 8/2004 |
| JP | 2004247820 | A | 9/2004 |
| JP | 2004254254 | A | 9/2004 |
| JP | 2004260258 | A | 9/2004 |
| JP | 2004260748 | A | 9/2004 |
| JP | 2004336351 | A | 11/2004 |
| JP | 2004533762 | A | 11/2004 |
| JP | 2004349777 | A | 12/2004 |
| JP | 2004350168 | A | 12/2004 |
| JP | 2004363877 | A | 12/2004 |
| JP | 2005033808 | A | 2/2005 |
| JP | 2005045368 | | 2/2005 |
| JP | 2005065101 | A | 3/2005 |
| JP | 2005072910 | A | 3/2005 |
| JP | 2005086234 | A | 3/2005 |
| JP | 2005086408 | | 3/2005 |
| JP | 2005124121 | A | 5/2005 |
| JP | 2005136529 | A | 5/2005 |
| JP | 2005151525 | A | 6/2005 |
| JP | 2005167502 | A | 6/2005 |
| JP | 2005210703 | A | 8/2005 |
| JP | 2005223722 | A | 8/2005 |
| JP | 2005223767 | A | 8/2005 |
| JP | 2005523616 | A | 8/2005 |
| JP | 2005236819 | A | 9/2005 |
| JP | 2005244698 | A | 9/2005 |
| JP | 2005252645 | A | 9/2005 |
| JP | 2005253038 | A | 9/2005 |
| JP | 2005253047 | A | 9/2005 |
| JP | 2005277599 | A | 10/2005 |
| JP | 2005277815 | A | 10/2005 |
| JP | 2005295400 | | 10/2005 |
| JP | 2005328231 | | 11/2005 |
| JP | 2005348203 | | 12/2005 |
| JP | 2005354326 | A | 12/2005 |
| JP | 2005537762 | T | 12/2005 |
| JP | 2006005792 | A | 1/2006 |
| JP | 2006501777 | A | 1/2006 |
| JP | 2007509531 | A | 4/2007 |
| JP | 2007525891 | A | 9/2007 |
| JP | 2007533256 | | 11/2007 |
| JP | 2008507219 | T | 3/2008 |
| JP | 2008228128 | A | 9/2008 |
| JP | 4927869 | | 2/2012 |
| KR | 960012088 | B1 | 9/1996 |
| KR | 100225765 | B1 | 10/1999 |
| KR | 20000035806 | A | 6/2000 |
| KR | 2000076038 | | 12/2000 |
| KR | 10362135 | | 11/2002 |
| KR | 20030024435 | A | 3/2003 |
| TW | 540210 | | 7/2003 |
| TW | 545006 | B | 8/2003 |
| TW | I230525 | | 4/2005 |
| TW | I239782 | | 9/2005 |
| TW | 286515 | | 1/2006 |
| TW | I250742 | | 3/2006 |
| TW | M292848 | | 6/2006 |
| WO | WO9701256 | A1 | 1/1997 |
| WO | WO9749258 | A1 | 12/1997 |
| WO | WO9808321 | | 2/1998 |
| WO | 9839938 | A2 | 9/1998 |
| WO | WO0074429 | | 12/2000 |
| WO | WO0101717 | A1 | 1/2001 |
| WO | WO0192992 | A2 | 12/2001 |
| WO | WO0223758 | A1 | 3/2002 |
| WO | WO0249387 | A1 | 6/2002 |
| WO | WO02078271 | A1 | 10/2002 |
| WO | WO02082742 | A1 | 10/2002 |
| WO | WO-02091623 | A1 | 11/2002 |
| WO | WO03001742 | | 1/2003 |
| WO | 03017596 | A2 | 2/2003 |
| WO | WO03039054 | A2 | 5/2003 |

(56) References Cited

FOREIGN PATENT DOCUMENTS

| | | | |
|---|---|---|---|
| WO | WO-03039064 | A1 | 5/2003 |
| WO | WO03090037 | A2 | 10/2003 |
| WO | WO2004012464 | | 2/2004 |
| WO | WO2004019529 | | 3/2004 |
| WO | WO2004023241 | A2 | 3/2004 |
| WO | WO2004032536 | | 4/2004 |
| WO | WO2004047348 | A1 | 6/2004 |
| WO | WO2004066646 | A1 | 8/2004 |
| WO | WO2004071022 | A1 | 8/2004 |
| WO | 2004080103 | A1 | 9/2004 |
| WO | WO2004077920 | A2 | 9/2004 |
| WO | WO2005013529 | A2 | 2/2005 |
| WO | WO2005020517 | | 3/2005 |
| WO | WO2005022846 | A1 | 3/2005 |
| WO | WO2005027556 | A1 | 3/2005 |
| WO | WO2005034433 | A1 | 4/2005 |
| WO | WO2005038606 | | 4/2005 |
| WO | WO2005039105 | | 4/2005 |
| WO | WO2005039128 | | 4/2005 |
| WO | 2005053346 | A1 | 6/2005 |
| WO | WO2005053253 | | 6/2005 |
| WO | WO2005053347 | A1 | 6/2005 |
| WO | WO2005055527 | | 6/2005 |
| WO | WO2005060209 | A1 | 6/2005 |
| WO | WO2005062552 | A1 | 7/2005 |
| WO | 2005071998 | A1 | 8/2005 |
| WO | WO2005076543 | | 8/2005 |
| WO | WO2005079012 | A1 | 8/2005 |
| WO | WO2005109657 | | 11/2005 |
| WO | WO2005109916 | | 11/2005 |
| WO | WO2005109917 | A1 | 11/2005 |
| WO | WO2005117463 | A2 | 12/2005 |
| WO | WO2005119478 | | 12/2005 |
| WO | 2006007946 | A1 | 1/2006 |
| WO | WO2006000617 | A1 | 1/2006 |
| WO | WO-2006006138 | A1 | 1/2006 |
| WO | WO2006057815 | | 6/2006 |
| WO | WO2006138122 | A2 | 12/2006 |
| WO | 2007038896 | A2 | 4/2007 |
| WO | 2007082247 | | 7/2007 |
| WO | WO2008014336 | A2 | 1/2008 |
| WO | 2008020162 | A2 | 2/2008 |
| WO | 2008072346 | A1 | 6/2008 |

OTHER PUBLICATIONS

Cabric D et al: "Implementation Issues in Spectrum Sensing for Cognitive Radios" Signals, Systems and Computers, 2004 Conference Record of the Thirty-Eighth Asilomar Conference on Pacific Grove, CA, XP-010781056 ,IEEE Nov. 7, 2004, p. 772-776.

Carlos Cordeiro, Kiran Challapali, Dagnachew Birru, Sai Shankar IEEE 802.22: The First Worldwide Wireless Standard Based on Cognitive Radios;New Frontiers in Dynamic Spectrum Access Networks, 2005 IEEE ; pp. 328-337 : XP-10855130A.

Costa-Requena J et al: "Incentive Problem for Ad Hoc Networks Scalability " Autonomic and Autonomous Systems and International Conference on Networking and Services, 2005. ICAS-ICNX 2005. Joint International Conference on Papette, Tahiti Oct. 23-28, 2005, Piscataway, NJ, USA, IEEE, Oct. 23, 2005, pp. 70-70, XP010864809.

Dagres et al., "Flexible Radio: A General Framework With Phy-Layer Algorithm-Design Insights" Eurocon 2005, Nov. 22-24, 2005 pp. 120-123, XP-10916036.

European Search Report—EP10187769 ,Search Authority -Munich Patent Office, Dec. 2, 2010.

Hung-Yu Wei, Richard D. Gitlin; Incentive Scheduling for Cooperative Relay in WWAN/WLAN Two-Hop-Relay Network; IEEE Communications Society/ WCNC 2005; pp. 1696-1701.

Juels, A. et al.: "Client Puzzles: A Cryptographic Countermeasure Against Connection Depletion Attacks" Proceedings of NDSS. Networks and Distributed Security Systems, XX, XX, Feb. 3, 1999, pp. 151-165, XP002340691 paragraph [0001] paragraph [0003].

Niels Hoven, Anant Sahai; "Power Scaling for Cognitive Radio"; 2005 International Conference on Wireless Networks, Communications and Mobile Computing; pp. 250-255.

Spyridon Panagiotakis et al: "Intelligent Service Mediation for Supporting Advanced Location and Mobility—Aware Service Provisioning in Reconfigurable Mobile Networks" IEEE Personal Communications, Oct. 2002 pp. 28-38, XP-011093874.

Taiwanese Search report -096101180- TIPO—Sep. 3, 2010.

Van De Beek, "ML Estimation of Time and Frequency Offset in OFDM Systems," IEEE Transactions on Signal Processing, 1997, 45 (7).

Waters, B. et al.: "New Client Puzzle Outsourcing Techniques for DoS Resistance" CCS'04, Oct. 29, 2004, pp. 1-11, XP002538930 Washington, DC, USA abstract paragraph [01.2].

Yanchao et al. : "Anonymous handshakes in mobile ad hoc networks" Military Communications Conference, 2004. MILCOM 2004. 2004 IEE Monterey , CA, USA, 31 PCT. -Nov. 3, 2004, Piscataway, NJ, USA, IEEE, vol. 3, Oct. 31, 2004, pp. 1193-1199, XP010825951.

Ylianttila et al: "Geolocation Information and Inter-Technology Handoff" ICC 2000. 2000 IEEE International Conference on Communications. Conference Record. New Orleans, LA, Jun. 18-22, 2000, pp. 1573-1577,—XP-001208676.

IEEE Computer Society, Part 15.4: Wireless Medium Access Control (MAC) and Physical Layer (PHY) Specifications for Low-Rate Wireless Personal Area Network (LRWPANs), IEEE Std 802. 15.4 (TM)—2003, The United States of America, IEEE, Oct. 1, 2003, pp. 13 to 21, 45 to 47, 111 to 120, and 147 to 153.

IEEE Computer Society, Part 15.3: Wireless Medium Access Control (MAC) and Physical Layer (PHY) Specifications for High Rate Wireless Personal Area Networks (WPANs), IEEE Std 802. 15.3 (TM)—2003, The United States of America, IEEE, Sep. 29,2003, pp. 164 and 165.

IEEE, Part 15.3: Wireless Medium Access Control (MAC) and Physical Layer (PHY) Specifications for High Rate Wireless Personal Area Networks (WPANs), 802.15.3, The United States of America, IEEE, Sep. 29, 2003, IEEE Std 802. 15. 3—2003, pp. 8 to 16, 108 to 111,116 to 117, 170 to 171,and 204 to206.

International Search Report and Written Opinion—PCT/US2009/058649, ISA/EPO—May 17, 2011.

Wada, Y. et al., "Consideration of OFDM Cellular System Using Single Band", IEICE Year 2002 Communication Society Convention Lecture Papers 1, Sep. 10-13, 2002, p. 355, B-5-58.

Taiwan Search Report—TW96101128—TIPO—Feb. 19, 2012.

Hlavacs H., et al., "Enhancing ZRTP by using Computational Puzzles", Journal of Universal Computer Science, vol. 14 No. 5, Feb. 28, 2008, pp. 693-716.

Kim S., et al., "Reliable transfer on wireless sensor networks", 2004. IEEE SECON 2004—IEEE, pp. 449-459.

Taiwan Search Report—TW098133893—TIPO—Oct. 11, 2012.

Feng W et al., "Design and implementation of network puzzles", INFOCOM 2005 Proceedings IEEE 24th Annual Joint Conference of the IEEE Computer and Communications Societies Mar. 2005, pp. 2372-2382, vol. 4.

* cited by examiner

METHODS AND APPARATUS FOR SUPPORTING MULTIPLE COMMUNICATIONS MODES OF OPERATION

RELATED APPLICATIONS

This application is a continuation-in-part of pending U.S. patent application Ser. No. 11/621,972, entitled "SUPPORT FOR WIDE AREA NETWORKS AND LOCAL AREA PEER-TO-PEER NETWORKS" which was filed Jan. 10, 2007 which claims the benefit of U.S. Provisional Patent application Ser. No. 60/758,010 entitled "METHODS AND APPARATUS FOR FACILITATING IDENTIFICATION, SYNCHRONIZATION OR ACQUISITION USING BEACON SIGNALS" which was filed Jan. 11, 2006; U.S. Provisional Patent application Ser. No. 60/758,011 entitled "METHODS AND APPARATUS FOR USING BEACON SIGNALS FOR IDENTIFICATION, SYNCHRONIZATION OR ACQUISITION IN AN AD HOC WIRELESS NETWORK" which was filed Jan. 11, 2006; U.S. Provisional Patent application Ser. No. 60/758,012 entitled "METHODS AND APPARATUS FOR USING BEACON SIGNALS IN A COGNITIVE RADIO NETWORK" which was filed Jan. 11, 2006; U.S. Provisional Patent application Ser. No. 60/845,052 entitled "POWER ALLOCATION SCHEME" which was filed Sep. 15, 2006; U.S. Provisional Patent application Ser. No. 60/845,051 entitled "BEACONS IN A MIXED WIRELESS COMMUNICATION SYSTEM" which was filed Sep. 15, 2006; and U.S. Provisional Patent application Ser. No. 60/863,304 entitled "BEACONS IN A MIXED COMMUNICATION SYSTEM" which was filed Oct. 27, 2006 and are hereby expressly incorporated by reference in their entirety.

FIELD

The present application relates to wireless communications methods and apparatus and, more particularly, to methods and apparatus for supporting multiple modes of communication operation, e.g., with different parameters and/or frequency bands being used in the different modes of operation.

BACKGROUND

Wireless communications systems normally include more access terminals, e.g., mobile communications devices, than access routers such as base stations. For a communications system to be commercially successful the access terminals need to be of reasonable cost with lower cost access terminals making the terminals affordable to a larger number of customers than high priced access terminals. The drive to keep individual access terminals affordable to a wide range of individual users results in price pressure which encourages the use of inexpensive components in access terminals. In contrast, since base stations are used by multiple users, the cost of a base station is less price sensitive. As a result, more accurate and often more costly components are used in base stations than access terminals.

Thus, for cost reasons, e.g., relatively inexpensive and slightly inaccurate voltage controlled oscillators and/or other circuits may be used in access terminals. This can result in access terminals exhibiting clock and/or frequency errors which can normally be corrected for by adjusting a control input, e.g., voltage, to a voltage controlled oscillator or other component assuming sufficient input to allow for detection of the inaccuracy. In communications systems which include base stations with high quality components, such as most commercial cellular systems, to avoid interference from access terminals due to the inaccuracy of the access terminal components, access terminals normally receive timing and/or other signals from an access router in the cellular network which are then used by the access terminal to detect and/or adjust for inaccuracies in the access terminal. Based on the received signals, whether they be broadcast pilot signals, broadcast beacon signals, or specific signals directed to an individual access terminal as part of a closed loop control process involving an access router, an access terminal will normally perform a correction operation, e.g., an adjustment, so that its timing and/or frequency of operation matches that of an access router in the cellular system. Such adjustments may be made by altering a voltage on a voltage controlled oscillator and/or making other adjustments so that the access terminal operates in a more reliable and accurate manner than if such adjustments were not made based on signals received from an access router in the cellular system.

While highly accurate access routers are normally present in most commercial cellular systems using licensed spectrum, e.g., a licensed frequency band, in non-licensed spectrum access routers may be, e.g., low cost base stations which may not be any more accurate than the access terminals with which they interact. Furthermore, in peer to peer systems access routers may be omitted entirely and/or peer to peer devices may not transmit signals intended to be used as accurate timing or frequency reference signals. Such an approach may be acceptable from a cost perspective in the case of non-licensed spectrum since the user is not paying for the spectrum and some overall inefficiency resulting from interference due to device inaccuracies may not be of concern to an individual user of the unlicensed spectrum. However, the importance of a loss in overall communications throughput in a system due to use of inexpensive access terminals, access routers and/or peer to peer devices begins to increase when such devices are used in licensed spectrum because of the cost of the licensed spectrum. The importance of a loss in overall communications system throughput also begins to be more important when the unlicensed spectrum begins to become more congested making it in the general interest of the users of the unlicensed spectrum to decrease the interference caused to other devices so that communications in the unlicensed spectrum will become more reliable.

In view of the above, it should be appreciated that there is a need for methods and apparatus which would allow low cost communications devices to be used while still obtaining the advantages of adjustments made based on reliable and accurate signals which maybe, for example, transmitted by an access router in a cellular system using licensed spectrum.

SUMMARY

Methods and apparatus for supporting multiple communications modes of operation are described.

At least one exemplary embodiment is directed to a method of operating a first communications device with the method including selecting between a first mode of operation and a second mode of operation, said first mode of operation using a first set of parameters to operate said first communications device when communicating in a first frequency band, said second mode of operation using a second set of parameters to operate said first communications device when communicating in a second frequency band, said second set of parameters having a predetermined relationship to the first set of parameters; and making at least one device setting change in accordance with said predetermined relationship when a current mode of operation is different from a selected mode of operation. The method may include performing an adjustment operation based on a signal received in the first frequency band from a second communications device to adjust said first communications device to operate in accordance with a parameter in the first set of parameters.

In accordance with one exemplary embodiment, a first communications device comprises at least one processor configured to: select between a first mode of operation and a second mode of operation, said first mode of operation using a first set of parameters to operate said first communications device when communicating in a first frequency band, said second mode of operation using a second set of parameters to operate said first communications device when communicating in a second frequency band, said second set of parameters having a predetermined relationship to the first set of parameters; and make at least one device setting change in accordance with said predetermined relationship when a current mode of operation is different from a selected mode of operation. In the exemplary embodiment the first communications device also includes a memory coupled to said at least one processor.

In addition to exemplary methods and apparatus, various aspects are directed to a computer program product for use in a first communications device, comprising: a computer readable medium comprising code for causing at least one computer to select between a first mode of operation and a second mode of operation, said first mode of operation using a first set of parameters to operate said first communications device when communicating in a first frequency band, said second mode of operation using a second set of parameters to operate said first communications device when communicating in a second frequency band, said second set of parameters having a predetermined relationship to the first set of parameters; and code for causing the at least one computer to make at least one device setting change in accordance with said predetermined relationship when a current mode of operation is different from a selected mode of operation.

In accordance with some exemplary embodiments, a communications device, e.g., a first communications device which may be an access terminal, receives one or more signals in a first communications band from a second communications device. The second communications device may, and in some but not necessarily all embodiments is as an access router, e.g., a base station in a cellular communications system using a licensed frequency band. The signals maybe, for example, broadcast signals such as pilot signals or beacon signals or may also be closed loop control signals. In one example, in the case where the first communications device does not establish communications with the second communications device, the first communications device may carry out open-loop synchronization operations, based on the received broadcast signals, to adjust timing, sampling clock, or frequency synthesis. In another example, in the case where the first communications device establishes communications with the second communications device the second communications device may receive one or more signals from the first communications device and respond by sending a timing adjustment, power control or other closed loop control signal to the first communications device to facilitate or cause a communications related adjustment in the first communications device. Based on one or more signals received from the second communications device, the first communications devices performs an adjustment, e.g., a voltage controlled crystal oscillator adjustment, a transmission power adjustment and/or a frequency adjustment. The adjustment modifies the operation of the first device so that the first device operates in accordance with one or more communications parameters used for communicating in a first frequency band from which the signal was received from the second communications device. In this manner, the first communications device is able to perform a device calibration and/or adjustment operation based on one or more signals received from the second communications device thereby correcting for inaccuracies which may be due to the use of low cost components such as one or more low cost oscillators.

Having made an adjustment, e.g., a voltage control adjustment to a voltage controlled oscillator, based on one or more signals received from the second communications device, the first communications device can proceed to communicate, e.g., operating in a first mode of operation. In the first mode of operation the first communications device may, and in some embodiments does, communicate with the second communications device by transmitting and/or receiving signals in the first communications band in compliance with a first set of communications parameters, e.g., tone spacing, frequency and/or timing parameters. Alternatively, after making the adjustment based on the one or more received signals, the first communications device may switch to a second mode of operation in which it communicates using a second set of communications parameters in a second frequency band.

Communication in the second mode of operation may comply with a second communications standard which is different from a first communications standard with which the first communications device complies during the first mode of operation. To take advantage of the one or more adjustments in device operation based on the signal or signals received from the second communications device, the switch to the second mode of operation includes changing one or more device operating parameters without undoing the adjustment made based on the signal or signals received from the second communications device. In some embodiments, the second set of communications parameters include parameters which have a predetermined relationship to parameters in the first set of parameters. For example, the tone spacing, device clock speed and/or one or more other operating constraints expressed in terms of parameters may be a fixed known multiple of the corresponding parameter used in the first mode of operation. Any shift or adjustment in timing or frequency made during the first mode of operation remains applicable in the second mode of operation with the switch from the first mode to the second mode being implemented by making a simple change in one or more control parameters while still taking advantage of the adjustment made to conform device operation to one or more parameters in the first set of parameters. For example the sampling rate and tone spacing used in the second set of parameters may be twice that used in the first set of parameters with the change from the first mode to the second mode being implemented by simply changing the sampling rate and tone spacing by a factor of two after it was calibrated and/or adjusted to comply with the first set of parameters.

Depending on the embodiment, the second mode of operation may be a local area network mode of operation while the first mode of operation may be wide area network mode of operation. In some embodiments the first mode of operation is a cellular mode of operation while the second mode of operation is a peer to peer mode of operation. The first and second modes of operations may be in two different (e.g., non-overlapping) frequency bands. For example, the first mode of operation may be in a licensed band while the second mode of operation may be in an unlicensed band. In another embodiment, the first and second modes of operations are both in licensed bands, but the operators are different. Other options for the first and second modes of operation are also possible.

One exemplary embodiment is directed to a method of operating a first communications device and comprises: selecting between a first mode of operation and a second mode of operation, said first mode of operation using a first set of parameters to operate said first communications device when communicating in a first frequency band, said second mode of operation using a second set of parameters to operate said first communications device when communicating in a second frequency band, said second set of parameters having a predetermined relationship to the first set of parameters, and making at least one device setting change in accordance with said predetermined relationship when a current mode of operation is different from a selected mode of operation.

An exemplary communications device, in one but not necessarily all embodiments, comprises means for selecting between a first mode of operation and a second mode of operation, said first mode of operation using a first set of parameters to operate said first communications device when communicating in a first frequency band, said second mode of operation using a second set of parameters to operate said first communications device when communicating in a second frequency band, said second set of parameters having a predetermined relationship to the first set of parameters; and means for making at least one device setting change in accordance with said predetermined relationship when a current mode of operation is different from a selected mode of operation.

An exemplary computer program product for use in a first communications device, comprises a computer readable medium comprising code for causing at least one computer to select between a first mode of operation and a second mode of operation, said first mode of operation using a first set of parameters to operate said first communications device when communicating in a first frequency band, said second mode of operation using a second set of parameters to operate said first communications device when communicating in a second frequency band, said second set of parameters having a predetermined relationship to the first set of parameters; and code for causing the at least one computer to make at least one device setting change in accordance with said predetermined relationship when a current mode of operation is different from a selected mode of operation.

While various embodiments have been discussed in the summary above, it should be appreciated that not necessarily all embodiments include the same features and some of the features described above are not necessary but can be desirable in some embodiments. Numerous additional features and embodiments are discussed in the detailed description which follows.

DETAILED DESCRIPTION

Figure 1:
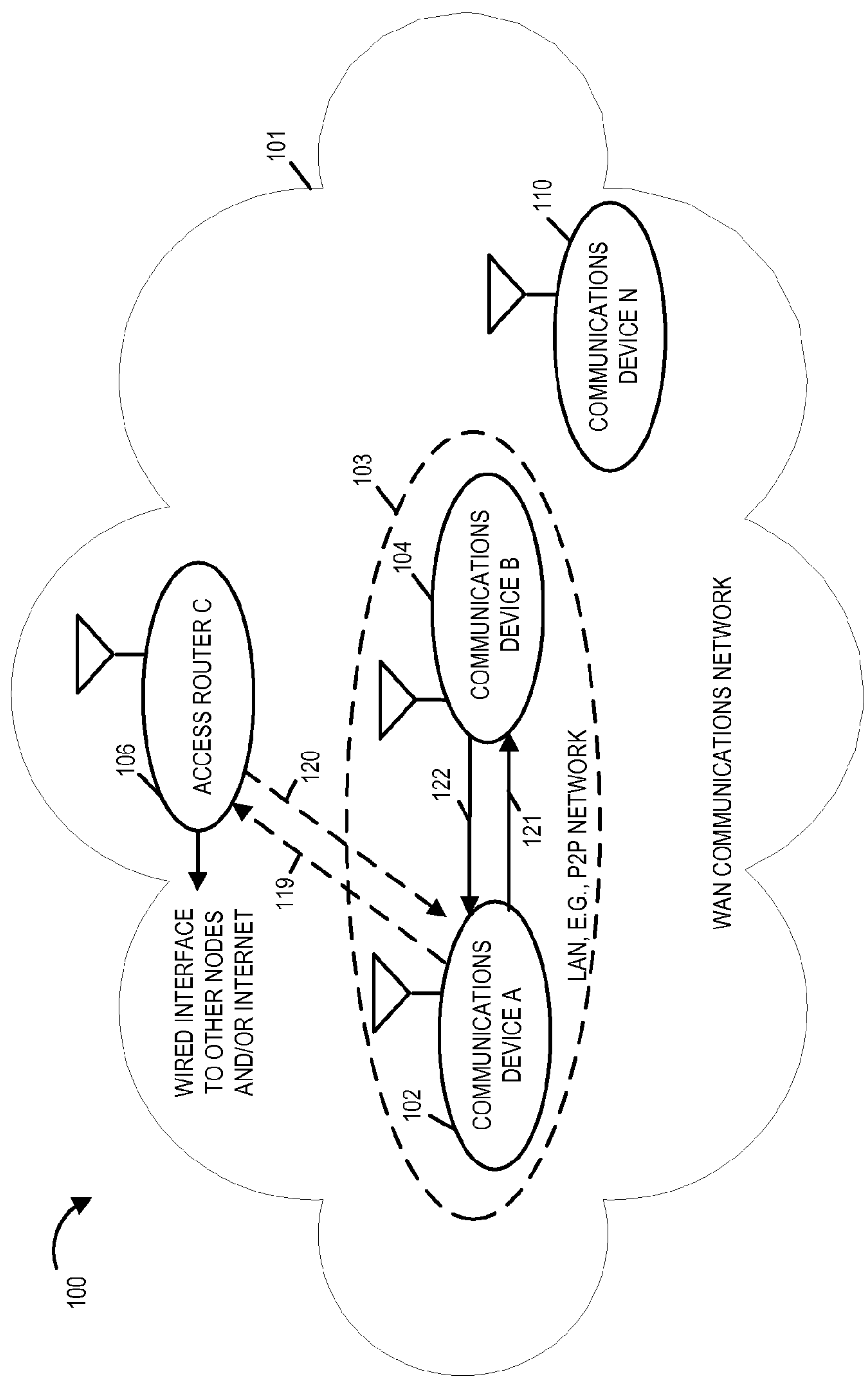
FIG. 1 illustrates an exemplary communications system implemented in accordance with an exemplary embodiment.

FIG. 1 illustrates an exemplary communications system 100. The system 100 is configured as a wide area network (WAN) 101. In addition to supporting communications with the WAN network 101, devices may also support local area networks (LANs), e.g., a peer to peer communications (P2P) network 103 which may include a subset of the elements of the WAN and/or other devices. Exemplary communications system 100 includes a plurality of communications devices, e.g., communications device A 102, communications device B 104, . . . , communications device N 110, and an access router C 106, e.g., a base station. As indicated by the antennas attached to each of devices 102 through 110, the devices support wireless communications. Although one access router 106 has been shown in the communications network 100, it should be appreciated that the communications network may, and sometimes does include several access routers. The access router C 106 also includes a wired interface, which couples access router C 106 to other nodes and/or the Internet, in addition to a wireless communications interface. In accordance with various exemplary embodiments some communications devices in the network 100, in addition to being capable of operating in compliance with communications standard associated with the WAN network 101, are also capable of operating using the communications standard associated with the LAN 103, e.g., P2P network 103.

The access router C 106 transmits signal 120, e.g., pilot, beacon and/or closed loop timing control signals. Closed loop timing control signals may be signals directed to an individual communications device 102, 104, 110, instructing the specific device to make a timing adjustment, e.g., a timing offset or oscillator frequency adjustment. To implement the oscillation frequency adjustment, the communications device may change a control voltage applied to a voltage controlled crystal oscillator used to control, e.g., signal sampling rate, chip rate and/or transmission frequency. The closed loop control signal may be in response to a signal 119 to the access router C 106. Thus, in accordance with one exemplary embodiment, first communications device A 102 receives a signal, e.g., signal 120, in a first communications band (e.g., first frequency band) from a second communications device in the network 100, e.g. access router C 106. The signal 120 may be, e.g., a pilot signal, broadcast by the access router C 106. In some embodiments, the signal 120 may be a beacon signal and/or a closed loop control signal. In one exemplary embodiment, the first communications device A 102 performs an adjustment operation based on the received signal 120 in the first frequency band to, e.g., modify the operation of the first communications device A 102, so that the first communications device 102 operates in compliance with one or more parameters used for communicating in the first frequency band in which the signal 120 was received from the access router C 106. In some embodiments the adjustment operation includes, e.g., a voltage controlled oscillator adjustment, a transmission power adjustment and/or frequency adjustment. The adjustment operation so performed by the first communications device 102 allows the first device 102 to compensate and/or correct for inaccuracies which may arise due to the use of low cost components such as low cost oscillators and/or other circuit elements. As a result of the adjustment/calibration based on the signal or signals received from the access router C 106, communications device A is able to communicate in accordance with the first set of parameters despite the possible use of low cost components.

Following the adjustment operation based on the signal 120 received from the second communications device, e.g., access router C 106, the first communications device 102 may optionally communicate with the second device, e.g., access router C 106, or another device using the first frequency band. This communication may occur while the first communications device 102 operates in, e.g., a first mode of operation. The first set of communications parameters includes tone spacing, frequency, chip rate, signal sampling rate and/or timing parameters. Thus, in some embodiments where the first communications device A 102 wishes to communicate traffic data to the access router C 106, the first device A 102 may transmit traffic data in the first frequency band while operating in the first mode of operation, to the access router C 106. In some other embodiments, following the adjustment operation based on the signal 120 received from the second communications device 106, the first communications device A 102 may select to switch to a second mode of operation in which the first device 102 communicates with a third communications devices, e.g., communications device B 104, in accordance with a second set of communications parameters, in a second frequency band. To take advantage of the adjustments/calibrations performed based on the received signals from the access router C 106, one or more of the second set of parameters is derivable from the first set of parameters. Thus, the adjustment made to comply with the first set of parameters remains relevant when switching to the second set of parameters.

As shown in FIG. 1, in some embodiments the first communications device A 102 sends and receives signals 121, 122 to and from a third communications device, e.g., communications device B 104. Signals 121, 122 may be in a second frequency band used for LAN communications which may, but in some embodiments does not, overlap the first frequency band used for WAN communications. In at least some embodiments, the signal 121 may be a transmission request signal, the signal 122 may be, e.g., a transmission request response signal, in response to a transmission request from the first device 102 to transmit data to the third communications device B 104. The first communications device may communicate traffic data 133 to the third communications device B 104 while operating in the second mode of operation.

Thus in one example as shown in FIG. 1, a first communications device A 102 may operate in the first mode to communicate with the second communications device, i.e., access router C 106, using the communications standards, first frequency band and communication and/or control parameters associated with the WAN network 100, during, e.g., a first period a time. Thus in some embodiments the first mode of operation is a wide area network (WAN) mode of operation. At some other time, e.g., subsequent to the adjustment operation based on the signal from the access router C 106, the first communications device A 102 may operate in the second mode to communicate with a third communications device, e.g., communications device B 104, using the communications standards and parameters, e.g., communications and/or control parameters, associated with the LAN network 103. Communication in the second mode may be during a second period a time which may, but need not, follow said first period of time. As operation continues the first communications device A 102 may change back and forth between first and second modes of operation depending on which device it seeks to communicate with. In some embodiments the second mode of operation is a local area network (LAN) mode of operation.

Figure 2:
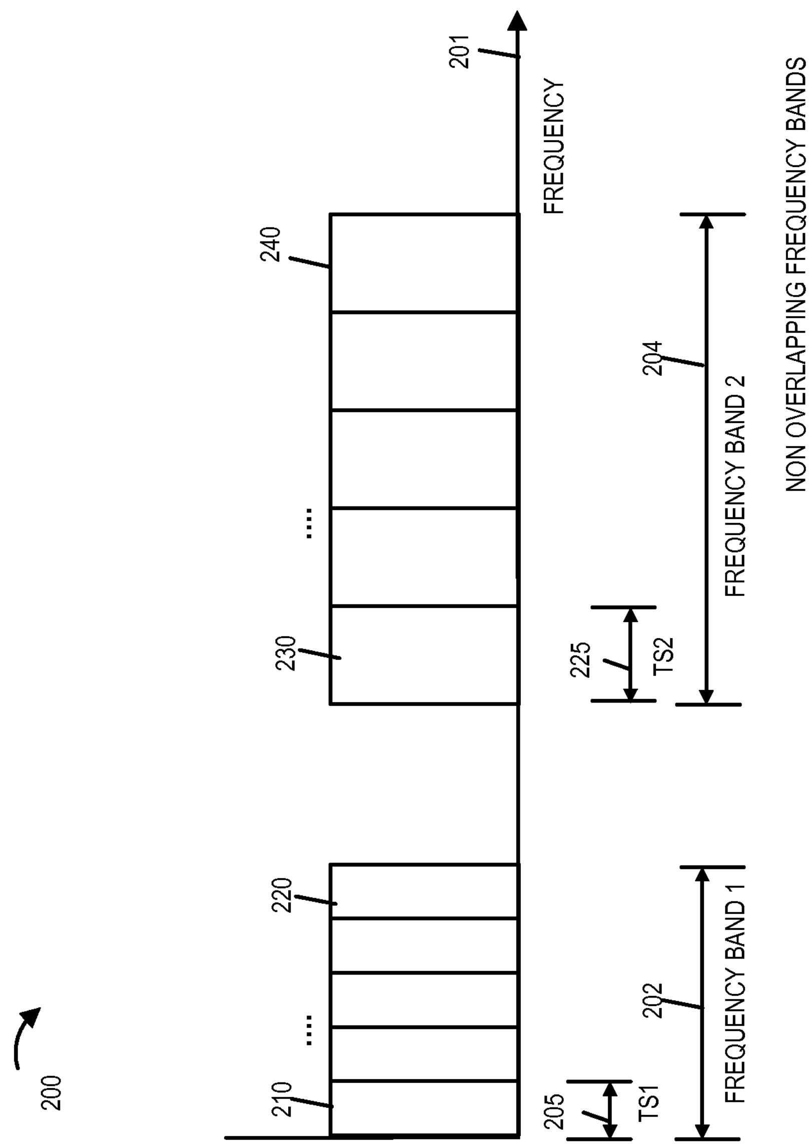
FIG. 2 illustrates exemplary first and second frequency bands including frequency resources, which may be used by a communications device of the system of FIG. 1.

FIG. 2 is a drawing 200 of exemplary first and second frequency bands 202, 204 including frequency resources, e.g., tones, which may be used by the first communications device 102 while operating in different modes of operation with, as shown, frequency 201 being represented by the horizontal axis.

As shown in FIG. 2, the first frequency band 202 includes a plurality of N tones, e.g., tones 210, . . . , 220, having a first tone spacing TS1 205. The second frequency band 204 also includes a plurality of N tones, e.g., tones 230, . . . , 240. The tone spacing TS2 225 in the second frequency band 204 is a predetermined multiple of the tone spacing TS1 205, e.g., an integer multiple such as two in the case of the exemplary embodiment shown in FIG. 2. While both bands 202, 204 are shown having the same number of tones, this is not mandatory. In accordance with various embodiments, a first communications device, e.g., communications device A 102 of FIG. 1, while operating in the first mode may and sometimes does communicate with the access router C 106 using the first frequency band 202. However, when the first communications device A 102 switches to the second mode of operation to communicate with, e.g., the third communications device B 104, the first communications device 102 communicates using the second frequency band 204. In at least some embodiments the second frequency band 204 has a predetermined relationship with the first frequency band. For example, the second frequency band may have a bandwidth which is a multiple, e.g., twice, of the bandwidth of the first frequency band, or the tone spacing TS2 225 in the second frequency band 204 may be twice the tone spacing TS1 205 in the first frequency band. Since the predetermined relationship exists, when the first communications device A 102 makes a transition, e.g., switches, from the first mode of operation to the second mode of operation, the first communications device A 102 may take advantage of the one or more adjustments that might have already been made earlier for the first device A 102 to operate in the first mode of operation. For example, the communications device A 102 may simply increase or decrease the rate of an oscillation used to control sampling and/or transmission frequency without undoing the initial oscillation correction made based on the signal or signals received from the access router C 106. Thus, it should be appreciated that when switching to the second mode of operation from the first mode, the first communications device A 102 may make adjustments so that it operates in the second mode of operation without undoing the earlier adjustments made based on the signal 120 received from the second communications device, i.e., the access router C 106. The earlier adjustments, e.g., any shift made in timing and/or frequency during the first mode of operation, remain valid in the second mode with simple changes being made in one or more parameters by considering the predetermined relationship between the first and second frequency bands.

The first and second frequency bands 202, 204 shown in FIG. 2 are non-overlapping frequency bands but in some embodiments the first and second frequency bands 202, 204 are overlapping frequency bands. As discussed, the first frequency band 202 may be used for WAN communications and the second band 204 for LAN communications.

Figure 3:
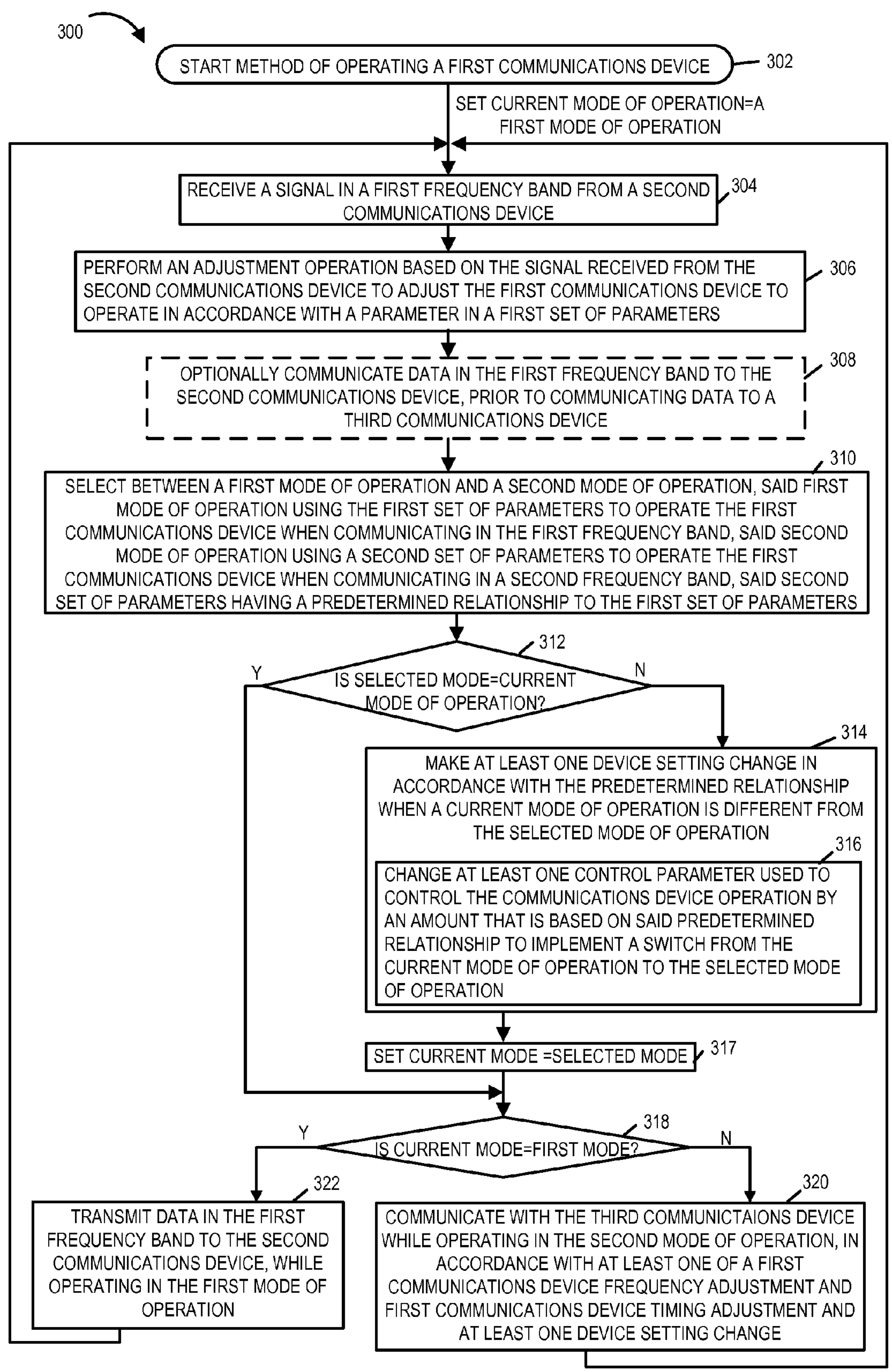
FIG. 3 is a flowchart showing the steps of an exemplary method of operating a first communications device, in accordance with one exemplary embodiment.

FIG. 3 is a flowchart 300 showing the steps of an exemplary method of operating a first communications device, in accordance with an exemplary embodiment. The first communications device can be, e.g., communications device A 102 of FIG. 1.

Operation starts in step 302, e.g., where the first communications device A 102 is powered on and initialized. It should be appreciated that during initialization stage, the current mode of operation of the first communications device A 102 is set to be the first mode of operation. The operation proceeds from start step 302 to steps 304.

In step 304 the first communications device 102 receives a signal, e.g., signal 120 in the first frequency band, from a second communications device, e.g., access router C 106. As discussed earlier the received signal 120 may be, e.g., a pilot signal, a beacon signal, and/or a control signal. In some embodiments, for example where communications establishes between the first communications device 102 and the second communications device 106, the signal 120 may be, e.g., a timing and/or frequency adjustment signal such as a command to make a timing or frequency adjustment, a power control signal or some other closed loop control signal, communicated from the second communications device 106 to the first device 102 in response to one or more signals that the second device 106 may have received from the first communications device 102. Operation proceeds from step 304 to step 306. In step 306 the first communications device A 102 performs an adjustment operation based on the signal 120 received from the second device, e.g., access router C 106, to adjust the first communications device to operate in accordance with a parameter in a first set of parameters. In some embodiments the adjustment is at least one of a first communications device frequency adjustment or first communications device timing adjustment. The timing and/or frequency adjustment may be implemented by modifying a voltage used to control a voltage controlled oscillators. The adjustment modifies the operation of the first communications device A 102 so that it operates in accordance with one or more communications parameters in the first set. The first set of parameters may be, e.g., a list of communications parameters used for communicating in a first frequency band, e.g., for controlling communication. The first set of parameters may include parameters, such as, sampling rate parameters, tone spacing parameters, frequency band parameters etc.

Operation proceeds form step 306 to step 308 which is an optional step may be performed optionally. In optional step 308 traffic data is communicated in the first frequency band to the second communications device C 106, from which a signal, e.g., signal 120, was received, prior to communicating data to the third communications device B 104. Step 308 may be skipped for example when the first device A 102 does not have traffic data to communicate to the second communications device 106. Operation proceeds from step 308 to step 310 when optional step 308 is performed or directly from step 306 to step 310 when optional step 308 is skipped.

In step 310 the first communications device A 102 selects between a first mode of operation and a second mode of operation, the first mode of operation includes using the first set of parameters to operate the first communications device 102 when communicating in the first frequency band, the second mode of operation includes using a second set of parameters to operate the first communications device 102 when communicating in a second frequency band, the second set of parameters having a predetermined relationship to the first set of parameters. In some embodiments, the first mode of operation is a communications mode of operation in which communications in the first frequency band is supported and the second mode of operation is a communications mode of operation in which communications in a second frequency band is supported. As discussed above, in some embodiments the first frequency band is a WAN communications frequency band while the second band is a LAN communications frequency band. The first and second frequency band do not overlap in some embodiments.

Following the selection between the first mode and second mode of operation in step 310, the operation proceeds to step 312 wherein a determination is made whether the selected mode of operation (selected in step 310) is the current mode of operation. It should be noted that initially the current mode of operation was set to be the first mode of operation during the initialization stage of the first communications device 102. However, over time the current mode of operation may be changed from the first mode of operation. Based on the determination in step 312, operation proceeds to step 314 or step 318. In the event, when the determination step 312 determines that the selected mode is not the current mode of operation, operation proceeds to step 314. This may be the case, for example when the current mode is the first mode of operation, and the second mode of operation was selected in step 310. However if it determined in step 312 that the selected mode is in fact the current mode of operation, then the operation proceeds to step 318.

In step 314, the first communications device A 102 makes at least one device setting change in accordance with the predetermined relationship when the current mode of operation is different from the selected mode of operation. As an example consider a scenario when the current mode was set as the first mode having the first set of parameters associated with the operation in the first mode. If the second mode of operation is now selected, then in processing step 314 a device setting change is made so that the first communications device A 102 beings to operate in the second mode of operation in accordance with a second set of parameters. In some embodiments, the at least one device setting change is one of an oscillator rate change, a timing change or frequency change. In some but not necessarily all embodiments, the change involves changing a control parameter in the device by an integer multiple representing a predetermined difference between the parameter in the first and second sets. Thus the operation of the first communications device 102 may be modified by implementing at least one device setting change by an amount which, in at least some but not necessarily all embodiments, is an integer multiple of a corresponding parameter in the first set of parameters. For example, to modify the operation from the first mode to the second mode, the oscillator rate in the current mode may be changed, e.g., from X to 2X, assuming that oscillator rate used for operation in the first mode was X. In some embodiments, making at least one device setting change in step 314 sometimes also involves performing sub-step 316 which includes changing at least one control parameter, used to control the first communications device operation, by an amount that is based on the predetermined relationship to implement a switch from the current mode of operation to the selected mode of operation. Thus, the amount (e.g., twice, thrice etc.) by which the control parameter should to be changed to implement switching from the current mode of operation, e.g., the first mode, to the selected mode, e.g., second mode, is based on the predetermined relationship between the first set of parameters and the second set of parameters.

Operation proceeds from step 314 to step 317 wherein the current mode of operation is updated and set to the selected mode of operation. Operation proceeds from step 317 to step 318.

In step 318 a determination is made whether the current mode of operation is the first mode of operation. If it is determined in step 318 that the current mode of operation is not the first mode of operation then the operation proceeds from step 318 to step 320. The determination that the current mode of operation is not the first mode, means that the mode of operation of the first communications device A 102 is the second mode. In step 320 the first communications device A 102 communicates with the third communications device B 104, in the second mode of operation, said communicating being in accordance with the at least one of a first communications device frequency adjustment and first communications device timing adjustment (e.g., as made in step 306) and the at least one device setting change, e.g., as performed in step 314. Communicating with the third device B 104 in the second mode of operation may include, e.g., transmitting traffic data to the third communications device B 104 using the second frequency band. Operation proceeds from step 320 back to step 304 and the operation may continue.

However, if it is determined in step 318 that the current mode of operation is the first mode of operation then the operation proceeds from step 318 to step 322. In step 322, the first communications device A 102 operating in the first mode, transmits traffic data in the first frequency band to the second communications device, e.g., access router C 106. The traffic data transmission may be in response to, e.g., a transmission request response signal which might have been communicated earlier by the access router C 106 to the first communications device A 102. Operation proceeds from step 322 back to step 304.

Figure 4:
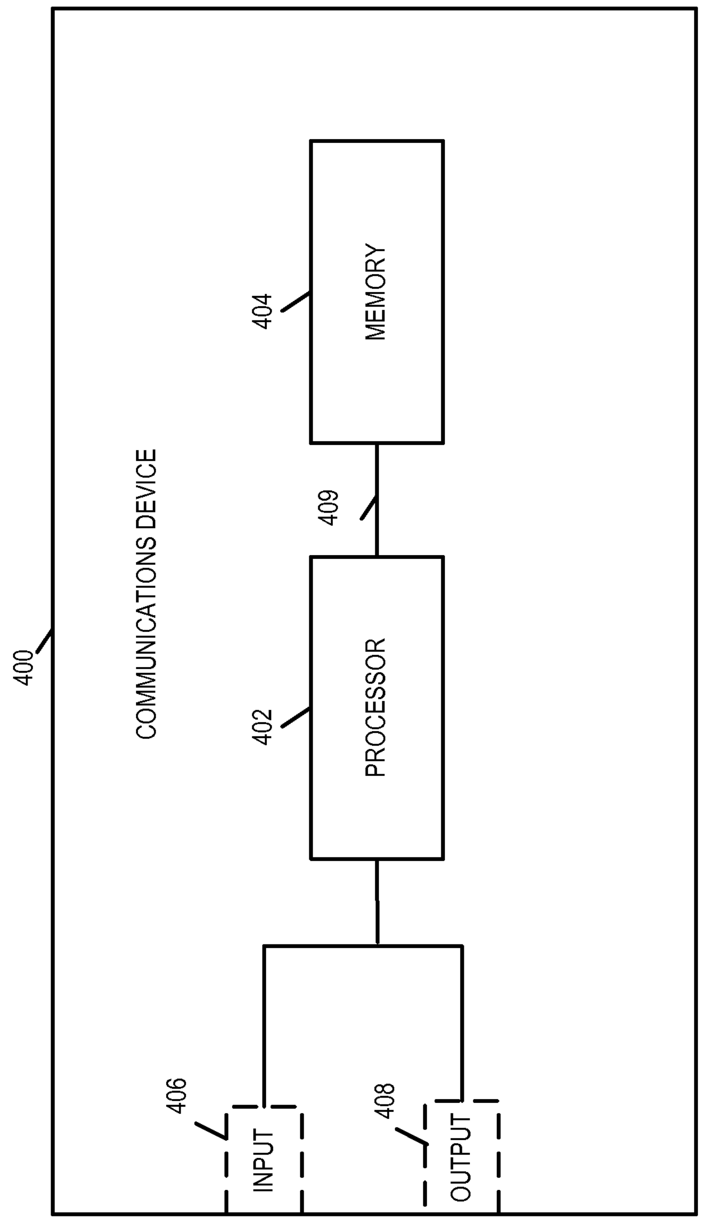
FIG. 4 shows an exemplary communications device which can be used in the system of FIG. 1.

FIG. 4 is a drawing of an exemplary communications device 400 in accordance with one exemplary embodiment. Communications device 400 maybe, and in at least one embodiments is, a mobile wireless terminal supporting peer to peer communications and implementing a method in accordance with flowchart 300 of FIG. 3. The communications device 400 may be used as the first communication device A 102 of FIG. 1. Communications device 400 includes a processor 402 and memory 404 coupled together via a bus 409 over which the various elements (402, 404) may interchange data and information. Communications device 400 further includes an input module 406 and an output module 408 which may be coupled to the processor 402 as shown. However, in some embodiments the input module and output module 406, 408 are located internal to the processor 402. Input module 406 can receive input signals. Input module 406 can, and in some embodiments does, include a wireless receiver and/or a wired or optical input interface for receiving input. Output module 408 may include, and in some embodiments does include, a wireless transmitter and/or a wired or optical output interface for transmitting output.

In some embodiments, processor 402 is configured to: select between a first mode of operation and a second mode of operation, said first mode of operation using a first set of parameters to operate the first communications device 400 when communicating in a first frequency band, said second mode of operation using a second set of parameters to operate the first communications device 400 when communicating in a second frequency band, said second set of parameters having a predetermined relationship to the first set of parameters, and make at least one device setting change in accordance with said predetermined relationship when a current mode of operation is different from a selected mode of operation. In some embodiments, the processor 402 is further configured to change at least one control parameter used to control communications device operation by an amount that is based on the predetermined relationship to implement a switch from the current mode of operation to the selected mode of operation. In some embodiments, the at least one device setting change is one of an oscillator rate change, a timing change or frequency change, said change being by an integer multiple of a corresponding parameter in said first set of parameters. In some embodiments, the first mode of operation is a communications mode of operation in which communications in the first frequency band is supported, and the second mode of operation is a communications mode of operation in which communications in a second frequency band is supported.

The processor 402 is further configured to perform an adjustment operation based on a signal received in the first frequency band from a second communications device to adjust the first communications device to operate in accordance with a parameter in the first set of parameters. In at least some embodiments, said adjustment is at least one of a first communication device frequency adjustment operation or first communications device timing adjustment. In some embodiments, when the selected mode of operation is the second mode of operation, the processor 402 is further configured to communicate with a third communications device, e.g., communications device B 104, while operating in the second mode of operation, said communicating being in accordance with the at least one of a first communications device frequency adjustment and first communications device timing adjustment and said at least one device setting change. The processor 402 is sometimes further configured to transmit data in the first frequency band, while operating in the first mode of operation, to the second communications device, e.g., access router 106, from which the signal was received, prior to communicating data to the third communications device. In some embodiments, the first and second frequency bands are non-overlapping frequency bands. In some embodiments, the first mode of operation is a wide area network mode of operation, and the second mode of operation is a local area network mode of operation. In some such embodiments, the local area network mode of operation is a peer to peer mode of operation.

Figure 5:
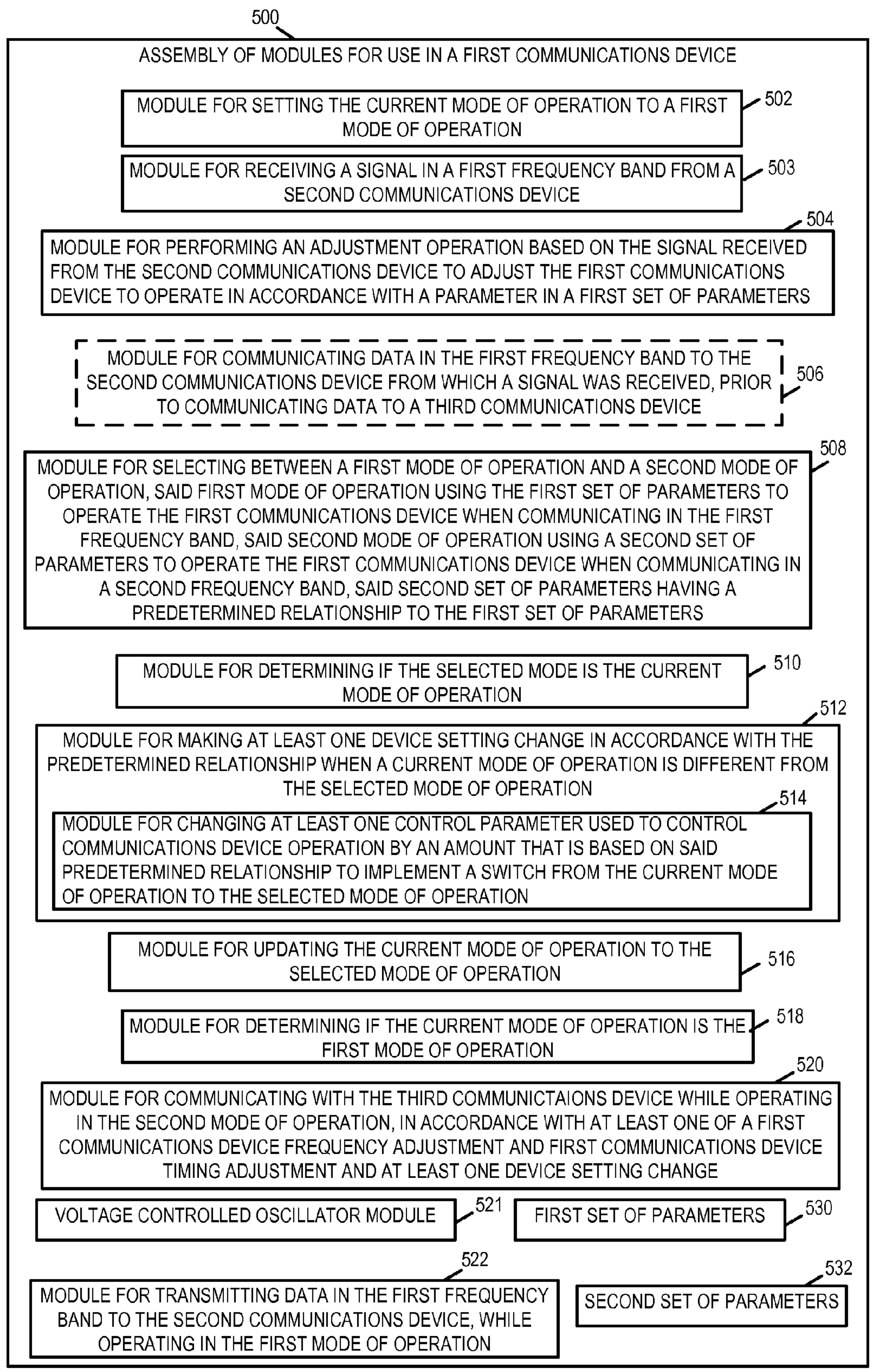
FIG. 5 illustrates an assembly of modules which can be used in the exemplary communications device of FIG. 4.

FIG. 5 is an assembly of modules 500 which can, and in some embodiments are, used in the communications device illustrated in FIG. 4. The modules in the assembly 500 can be implemented in hardware within the processor 402 of FIG. 4, e.g., as individual circuits. Alternatively, the modules may be implemented in software and stored in the memory 404 of the communications device 400 shown in FIG. 4. While shown in the FIG. 4 embodiment as a single processor, e.g., computer, it should be appreciated that the processor 402 may be implemented as one or more processors, e.g., computers.

When implemented in software the modules include code, which when executed by the processor 402, configure the processor to implement the function corresponding to the module. In embodiments where the assembly of modules 500 is stored in the memory 404, the memory 404 is a computer program product comprising a computer readable medium comprising code, e.g., individual code for each module, for causing at least one computer, e.g., processor 402, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 5 control and/or configure the communications device 400 or elements therein such as the processor 402, to perform the functions of the corresponding steps illustrated in the method flow chart 300 of FIG. 3.

As illustrated in FIG. 5, the assembly of modules 500 includes a module 502 for setting the current mode of operation to a first mode of operation while the communications device 400 is initializing, a module 503 for receiving a signal in a first frequency band from a second communications device, a module 504 for performing an adjustment operation based on the signal received in the first frequency band from the second communications device to adjust said communications device 400 to operate in accordance with a parameter in the first set of parameters, an optional module 506 for communicating data in the first frequency band to the second communications device, from which a signal was received, prior to communicating data to a third communications device, a module 508 for selecting between the first mode of operation and a second mode of operation, the first mode of operation using a first set of parameters to operate the first communications device when communicating in a first frequency band, the second mode of operation using a second set of parameters to operate said first communications device when communicating in a second frequency band, the second set of parameters having a predetermined relationship to the first set of parameters, a module 510 for determining whether the selected mode of operation is the current mode of operation, and a module 512 for making at least one device setting change in accordance with said predetermined relationship when a current mode of operation is different from a selected mode of operation. In some embodiments, the module 512 includes a module 514 for changing at least one control parameter used to control communications device operation by an amount that is based on the predetermined relationship to implement a switch from the current mode of operation to the selected mode of operation.

The assembly of modules 500 further includes a module 516 for updating the current mode of operation of the communications device to the selected mode of operation, a module 518 for determining if the current mode of operation of the device is the first mode of operation, a module 520 for communicating with the third communications device while operating in the second mode of operation, said communicating being in accordance with the at least one of a first communications device frequency adjustment and first communications device timing adjustment and said at least one device setting change, and a module 522 for transmitting data in said first frequency band, while operating in the first mode of operation, to the second communications device from which the signal was received. The assembly of modules 500 also includes, a voltage controlled oscillator module 521 which generates a sampling signal used to control the sampling rate of received signals and/or the frequency of transmitted signals. A control voltage applied to the voltage controlled oscillator 521 can be adjusted in accordance with the signal received from the first communications device so that it operates in a calibrated and reliable manner. The assembly of modules 500 may also include stored first and second sets of parameters. The first and second set of parameters 530, 532 may include sampling rate, chip rate, tone spacing and/or other control parameters used control device operation in the first and second modes of operation, respectively. The second set of parameters 532 may, and in some embodiments is, derived from the first set of parameters.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations, communications devices and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, a decision step, message generation, message signaling, switching, reception and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods described in the present application.

In some embodiments, the processor or processors, e.g., CPUs, of one or more devices, e.g., communications devices such as wireless terminals are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Some embodiments are directed to a computer program product comprising a computer-readable medium, e.g., a physical medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems such as CDMA systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In various embodiments the peer to peer communications devices are implemented as notebook computers, personal data assistants (PDAs), or other portable devices including receiver/transmitter circuits and logic and/or routines, for implementing the methods.

What is claimed is:

1. A method of operating a first communications device, comprising:

selecting between a first mode of operation and a second mode of operation, said first mode of operation using a first set of parameters to operate said first communications device when communicating in a first frequency band, said first set of parameters including a parameter specifying a first tone spacing, said second mode of operation using a second set of parameters to operate said first communications device when communicating in a second frequency band, said second set of parameters having a predetermined relationship to the first set of parameters; and making at least one device setting change in accordance with said predetermined relationship when a current mode of operation is different from a selected mode of operation, said at least one device setting change including changing a control parameter in the first communications device by an integer multiple representing a predetermined difference between a parameter in the first and second sets of parameters, said at least one device setting change being one of an oscillator rate change, a timing change, or a frequency change, said change being by an integer multiple of a corresponding parameter in said first set of parameters.

2. The method of claim 1, wherein the method further comprises:

performing an initial oscillator correction based on a signal received in the first frequency band from a second communications device to adjust said first communications device to operate in accordance with a parameter in the first set of parameters.

3. The method of claim 2, wherein said at least one device setting change is said oscillator rate change, said oscillator rate change including increasing or decreasing the rate of an oscillator used to control sampling without undoing the initial oscillator correction.

4. The method of claim 2, further comprising, when said selected mode of operation is said second mode of operation:

communicating with a third communications device while operating in said second mode of operation.

5. The method of claim 4, further comprising:

transmitting data in said first frequency band, while operating in said first mode of operation, to the second communications device from which said signal was received prior to communicating data to said third communications device.

6. The method of claim 4, wherein said first and second frequency bands are non-overlapping frequency bands.

7. The method of claim 6, wherein the first mode of operation is a Wide Area Network mode of operation; and wherein the second mode of operation is a Local Area Network mode of operation.

8. The method of claim 6, where the Local Area Network mode of operation is a peer to peer mode of operation.

9. The method of claim 1, wherein said making at least one device setting change includes:

changing a sampling rate used to sample a received signal.

10. The method of claim 1, wherein making at least one device setting change includes: modifying a voltage used to control a voltage controlled oscillator.

11. The method of claim 1, wherein the first mode of operation is a communications mode of operation in which communications in the first frequency band is supported; and wherein the second mode of operation is a communications mode of operation in which communications in the second frequency band is supported.

12. A first communications device, comprising:

at least one processor configured to:

select between a first mode of operation and a second mode of operation, said first mode of operation using a first set of parameters to operate said first communications device when communicating in a first frequency band, said first set of parameters including a parameter specifying a first tone spacing, said second mode of operation using a second set of parameters to operate said first communications device when communicating in a second frequency band, said second set of parameters having a predetermined relationship to the first set of parameters; and make at least one device setting change in accordance with said predetermined relationship when a current mode of operation is different from a selected mode of operation, said at least one device setting change including changing a control parameter in the first communications device by an integer multiple representing a predetermined difference between a parameter in the first and second sets of parameters, said at least one device setting change being one of an oscillator rate change, a timing change, or a frequency change, said change being by an integer multiple of a corresponding parameter in said first set of parameters; and a memory coupled to said at least one processor.

13. The first communications device of claim 12, wherein the at least one processor is further configured to:

perform an initial oscillator correction based on a signal received in the first frequency band from a second communications device to adjust said first communications device to operate in accordance with a parameter in the first set of parameters.

14. The first communications device of claim 13, wherein said at least one device setting change is said oscillator rate change, said oscillator rate change including increasing or decreasing the rate of an oscillator used to control sampling without undoing the initial oscillator correction.

15. The first communications device of claim 13, wherein when said selected mode of operation is said second mode of operation, the at least one processor is further configured to:

communicate with a third communications device while operating in said second mode of operation.

16. The first communications device of claim 15, wherein the at least one processor is further configured to:

transmit data in said first frequency band, while operating in said first mode of operation, to the second communications device from which said signal was received, prior to communicating data to said third communications device.

17. The first communications device of claim 12, wherein said at least one processor is further configured to:

change a sampling rate used to sample a received signal.

18. The first communications device of claim 12, wherein said at least one processor is further configured to modify, as part of being configured to make at least one device setting change, a voltage used to control a voltage controlled oscillator.

19. The first communications device of claim 12, wherein the first mode of operation is a communications mode of operation in which communications in the first frequency band is supported; and wherein the second mode of operation is a communications mode of operation in which communications in the second frequency band is supported.

20. A first communications device, comprising:

means for selecting between a first mode of operation and a second mode of operation, said first mode of operation using a first set of parameters to operate said first communications device when communicating in a first frequency band, said first set of parameters including a parameter specifying a first tone spacing, said second mode of operation using a second set of parameters to operate said first communications device when communicating in a second frequency band, said second set of parameters having a predetermined relationship to the first set of parameters; and means for making at least one device setting change in accordance with said predetermined relationship when a current mode of operation is different from a selected mode of operation, said at least one device setting change including changing a control parameter in the first communications device by an integer multiple representing a predetermined difference between a parameter in the first and second sets of parameters, said at least one device setting change being one of an oscillator rate change, a timing change, or a frequency change, said change being by an integer multiple of a corresponding parameter in said first set of parameters.

21. The first communications device of claim 20, wherein the first communications device further comprises:

means for performing an initial oscillator correction based on a signal received in the first frequency band from a second communications device to adjust said first communications device to operate in accordance with a parameter in the first set of parameters.

22. The first communications device of claim 21, wherein said at least one device setting change is said oscillator rate change, said oscillator rate change including increasing or decreasing the rate of an oscillator used to control sampling without undoing the initial oscillator correction.

23. The first communications device of claim 21, further comprising:

means for communicating with a third communications device while operating in said second mode of operation, when said selected mode of operation is said second mode of operation.

24. The first communications device of claim 23, further comprising:

means for transmitting data in said first frequency band, while operating in said first mode of operation, to the second communications device from which said signal was received prior to communicating data to said third communications device.

25. The first communications device of claim 20, wherein said means for making at least one device setting change comprises:

means for changing a sampling rate used to sample a received signal.

26. The first communications device of claim 20, wherein said means for making at least one device setting change include means for modifying a voltage used to control a voltage controlled oscillator.

27. The first communications device of claim 20, wherein the first mode of operation is a communications mode of operation in which communications in the first frequency band is supported; and wherein the second mode of operation is a communications mode of operation in which communications in the second frequency band is supported.

28. A computer program product for use in a first communications device, comprising:

a non-transitory computer readable medium comprising:

code for causing at least one computer to select between a first mode of operation and a second mode of operation, said first mode of operation using a first set of parameters to operate said first communications device when communicating in a first frequency band, said first set of parameters including a parameter specifying a first tone spacing, said second mode of operation using a second set of parameters to operate said first communications device when communicating in a second frequency band, said second set of parameters having a predetermined relationship to the first set of parameters; and code for causing the at least one computer to make at least one device setting change in accordance with said predetermined relationship when a current mode of operation is different from a selected mode of operation, said at least one device setting change including changing a control parameter in the first communications device by an integer multiple representing a predetermined difference between a parameter in the first and second sets of parameters, said at least one device setting change being one of an oscillator rate change, a timing change, or a frequency change, said change being by an integer multiple of a corresponding parameter in said first set of parameters.

29. The computer program product of claim 28, wherein the non-transitory computer readable medium further comprises:

code for causing the at least one computer to perform an initial oscillator correction based on a signal received in the first frequency band from a second communications device to adjust said first communications device to operate in accordance with a parameter in the first set of parameters.

30. The computer program product of claim 28, wherein the non-transitory computer readable medium further comprises:

code for causing the at least one computer to change a sampling rate used to sample a received signal.

* * * * *